(12) United States Patent
Nylund

(10) Patent No.: US 6,385,271 B2
(45) Date of Patent: *May 7, 2002

(54) NUCLEAR FUEL ASSEMBLY

(75) Inventor: Olov Nylund, Västerås (SE)

(73) Assignee: Westinghouse Atom AB, Västerås (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,613

(22) PCT Filed: Jun. 18, 1997

(86) PCT No.: PCT/SE97/01080

§ 371 Date: Feb. 10, 1999

§ 102(e) Date: Feb. 10, 1999

(87) PCT Pub. No.: WO97/49095

PCT Pub. Date: Dec. 24, 1997

(30) Foreign Application Priority Data

Jun. 20, 1996 (SE) .............................. 9602450

(51) Int. Cl.$^7$ ............................................. G21C 3/322
(52) U.S. Cl. ................... 376/439; 376/352; 376/400; 376/434; 376/438; 376/441; 376/442; 376/456; 376/454
(58) Field of Search ................. 376/440, 433, 376/446, 443, 439, 434, 352, 438, 453, 454, 441, 442, 400

(56) References Cited

U.S. PATENT DOCUMENTS

| | | | | |
|---|---|---|---|---|
| 3,128,235 A | * | 4/1964 | Hackney et al. | 376/433 |
| 3,284,315 A | * | 11/1966 | Thome | 376/440 |
| 3,598,700 A | * | 8/1971 | Lambert | 376/434 |
| 3,941,654 A | * | 3/1976 | Tarasuk et al. | 376/433 |
| 4,576,786 A | * | 3/1986 | DeMario | 376/439 |
| 4,585,615 A | * | 4/1986 | DeMario | 376/442 |
| 4,844,860 A | * | 7/1989 | Hatfield | 376/439 |
| 4,999,153 A | * | 3/1991 | Johansson et al. | 376/443 |
| 5,243,634 A | * | 9/1993 | Bryan | 376/439 |
| 5,867,551 A | * | 2/1999 | Toshihiko | 376/352 |

FOREIGN PATENT DOCUMENTS

| | | | | |
|---|---|---|---|---|
| CA | 1250966 | * | 3/1989 | ................. 359/77 |
| DE | 2 204 168 | | 8/1973 | |
| EP | 0 198 281 A1 | | 10/1986 | |
| EP | 0 388 091 A2 | | 9/1990 | |
| EP | 0512137 A1 | * | 11/1992 | ......... G21C/19/307 |
| FR | 1214056 | * | 4/1960 | |
| GB | 874039 | * | 8/1961 | |
| JP | 7311265 | * | 5/1973 | |
| WO | WO 96/20483 | * | 7/1996 | ............ G21C/3/30 |
| WO | WO 97/49093 | * | 12/1997 | ............ G21C/3/18 |
| WO | WO 97/49098 | * | 12/1997 | ........... G21C/3/322 |

OTHER PUBLICATIONS

Patent Abstracts of Japan, vol. 13, No. 87, P–835, Abstract of JP,A,63–269094 (Mitsubishi Nuclear Fuel Co.Ltd.), Nov., 1988.

* cited by examiner

Primary Examiner—Peter M. Poon
Assistant Examiner—John Richardson
(74) Attorney, Agent, or Firm—Connolly Bove Lodge & Hutz

(57) ABSTRACT

The present invention relates to a fuel assembly for a light-water reactor with a substantially square cross section wherein the fuel assembly comprises a plurality of fuel rods (4). The fuel rods (4) extend between a bottom tie plate (5) and a top tie plate (6) and a coolant is adapted to flow upwards through the fuel assembly. At least one of the top tie plates (6) or the bottom tie plates (5) comprises flow openings (22, 22a, 22b) for the passage of the coolant and side supports (17) for supporting the fuel rods (4) in the lateral direction. The side supports (17) are designed in one and the same sheet-metal piece as the flow openings (22, 22a, 22b) and the side supports (17) are folded substantially 90° in relation to the other structure of the top tie plate (6) or the bottom tie plate (5).

16 Claims, 9 Drawing Sheets

NUCLEAR FUEL ASSEMBLY

TECHNICAL FIELD

The present invention relates to a nuclear fuel assembly with a substantially square cross section for a light water reactor comprising a plurality of fuel rods extending between a top tie plate and a bottom tie plate.

BACKGROUND ART

In a nuclear reactor, moderated by means of light water, the fuel exists in the form of fuel rods, each of which contains a stack of pellets of a nuclear fuel arranged in a cladding tube, a column of extruded fuel cylinders or an uninterrupted column of vibration-compacted powdered fuel. The cladding tube is normally made of a zirconium-base alloy. A fuel bundle comprises a plurality of fuel rods arranged in parallel with each other in a certain definite, normally symmetrical pattern, a so-called lattice. The fuel rods are retained at the top by a top tie plate and at the bottom by a bottom tie plate. To keep the fuel rods at a distance from each other and prevent them from bending or vibrating when the reactor is in operation, a plurality of spacers are distributed along the fuel bundle in the longitudinal direction. A fuel assembly comprises one or more fuel bundles, each one extending along the main part of the length of the fuel assembly. Further, the fuel assembly comprises one or more centrally arranged channels which conduct non-boiling water through the fuel assembly to improve the moderation in the central parts of the fuel assembly.

The core is immersed in water which serves both as coolant and as neutron moderator. During operation, the water flows from below and upwards through the fuel assembly, whereby, in a boiling water light-water reactor, part of the water is transformed into steam. The percentage of steam increases towards the top of the fuel assembly. Consequently, the coolant in the lower part of the fuel assembly consists of water whereas the coolant in the upper part of the fuel assembly consists both of steam and of water. This difference between the upper and lower parts gives rise to special problems which must be taken into consideration when designing the fuel assembly.

It is therefore desirable to achieve a flexible fuel assembly for a boiling water reactor which, in a simple manner, may be given a shape in which the upper part of the fuel assembly differs from the lower part thereof. A fuel assembly for a boiling water reactor with these properties is shown in PCT/SE95/01478 (Int. Publ. No. WO 96/20483). This fuel assembly comprises a plurality of fuel units stacked on top of each other, each comprising a plurality of fuel rods extending between a top tie plate and a bottom tie plate. The fuel units are surrounded by a common fuel channel with a substantially square cross section. A fuel assembly of this type may in a simple manner be given different designs in its upper and lower parts.

Also in a light-water reactor of pressurized-water type, it may be desirable to design the fuel assemblies such that each fuel assembly comprises a plurality of fuel units stacked on top of each other. As described above, each one of the fuel units then comprises a plurality of fuel rods extending between a top nozzle and a bottom nozzle. A fuel assembly for a pressurized-water reactor, however, comprises no fuel channel.

One factor which must be taken into consideration when designing such fuel units for boiling water reactors is that the fuel rods must be kept at a distance from the fuel channel which surrounds them. In the same way, the fuel rods in a fuel assembly for a pressurized-water reactor must be kept at a distance from an adjacently located fuel assembly. Normally, these distances are achieved by designing spacers for retaining and positioning the fuel rods in relation to each other with members therefor. In a fuel assembly for a boiling water reactor, these members make contact with the fuel channel and in a fuel assembly for a pressurized-water reactor, similar members make contact with a spacer provided in an adjacently located fuel assembly. In those cases where shorter fuel units of the above-mentioned type are used, spacers are not necessary, so the spaced relationship must be achieved in some other way.

It is also common to arrange some form of mixing vanes for the spacers. Since the need of spacers is eliminated, these must be achieved in some other way.

In CA 1 250 966, a fuel unit is shown in Which the need of spacers is eliminated. The fuel unit is intended to be used in a reactor moderated with heavy water with pressure tubes. The fuel units and the pressure tubes have a circular cross section. The fuel rods are arranged between a pair of end plates. To ensure that the fuel rods are kept at a distance from the pressure tubes, the end plates are provided with beams extending radially out from the respective end plate and in a direction parallel to the direction of flow and between the fuel rods. The beams make contact with the inner surface of the pressure tube and thus keep the fuel rods at a distance therefrom. One disadvantage of this embodiment is that it is complicated to manufacture since the beams must be joined to the end plates in some way, for example by welding or soldering. Further, the end plates are designed to make tight contact with each other or be welded together to minimize the pressure drop of the coolant across the end plates. One disadvantage of this method is that the fuel rods in this region are not given a possibility of growing differentially because of thermal expansion during operation of the reactor. The problem with differential growth, however, is not so great in this type of reactors since the burnup of the fuel assemblies is limited.

An object of the present invention is to provide a fuel assembly with a plurality of short fuel units comprising top and bottom tie plates, respectively, provided with members which are adapted to keep the fuel rods at a distance from a surrounding, substantially rectangular, fuel channel or an adjacently arranged fuel assembly which is simple to manufacture.

It is another object of the invention to provide a fuel assembly with mixing vanes which are simple to achieve in the- fuel assembly.

A further object of the invention is to provide a fuel assembly with members which permit differential growth of the fuel rods.

SUMMARY OF THE INVENTION

The present invention relates to a fuel assembly with a substantially square cross section for a light-water reactor comprising a plurality of fuel rods arranged between a top tie plate and a bottom tie plate.

The fuel assembly comprises a plurality of fuel units, each comprising a plurality of fuel rods extending between a bottom tie plate and a top tie plate. The bottom tie plate and the top tie plate may be identically designed. According to one aspect of the invention, the bottom tie plate and the top tie plate are manufactured by punching in a sheet. The punched piece is provided with side supports which, prior to mounting to the fuel rods, are folded approximately 90° around an axis parallel to the plane of the top tie plate and the bottom tie plate, respectively. The task of the side supports, in a fuel assembly for a boiling water reactor, is to make contact with the fuel channel which surrounds the fuel rods to keep the fuel rods at a distance from the fuel channel. In a fuel assembly for a pressurized-water reactor, the task of the side pieces is to make contact with adjacent bottom and top tie plates, respectively, in order thus to keep adjacently located fuel assemblies at a distance from each other.

The top tie plates and the bottom tie plates, respectively, are made of sheet metal which is so thin that it is allowed to deform because of the differential growth of the fuel rods. It is suitable to choose a thickness of the sheet of the order of magnitude of 0.7 millimetres.

In one embodiment of the invention, the bottom tie plates are preferably provided with tabs during the punching, which tabs, prior to mounting, may be folded into the desired angle and shape for achieving mixing vanes. The task of the mixing vanes is to mix the coolant flowing upwards through the fuel assembly to increase the cooling capacity of the coolant. Increased cooling capacity is desirable particularly in the upper part of the fuel assembly, where the coolant has a higher temperature.

In a further embodiment of the invention, in connection with or after the punching, the bottom and top tie plates, respectively, are provided with a folded cross section. The folded cross section results in two adjoining top and bottom tie plates making contact with each-other in portions formed between the fuel rods and in the creation of a space between the top and bottom tie plates in those portions where the fuel rods are arranged. This space allows differential growth of the fuel rods because of thermal expansion by the top and bottom tie plates, respectively, being locally deformed into the space. In this way, the risk of fuel rods bending because of differential rod growth, hence preventing the full effect of the coolant, is reduced.

An advantage of the fuel assembly according to the invention is that it comprises top and bottom tie plates with side supports which are simple to manufacture from a plane or profiled sheet. The top and bottom tie plates may also be provided in a simple manner with mixing vanes and the desired cross section in one and the same work operation.

By forming the top and bottom tie plates, respectively, in thin sheet metal, only a small space is obtained between two fuel units stacked on top of each other. This is an advantage in that power peaks, which otherwise may arise in axial gaps without fissionable material, are reduced.

DETAILED DESCRIPTION OF THE PREFERRED EMBODIMENTS

Figure 1:
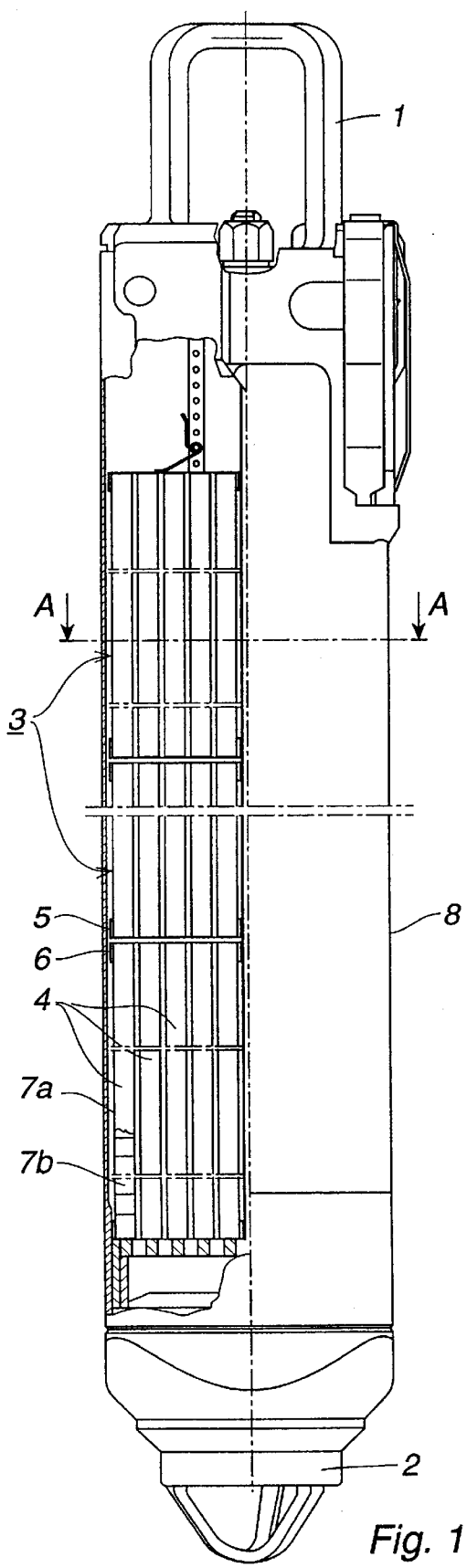
FIG. 1 shows in a vertical section a fuel assembly of a boiling water type with short fuel units.

FIG. 1 shows a fuel assembly of a boiling water type comprising an upper handle 1, a lower end portion 2 and a plurality of fuel units 3 stacked one above the other. Each fuel unit comprises a plurality of fuel rods 4 arranged in parallel and in spaced relationship to each other in a given lattice. Further, each fuel unit 3 comprises a bottom tie plate 5 and a top tie plate 6 for attachment of the fuel rods 4 in their respective positions in the lattice. The fuel units 3 are stacked on top of each other in the longitudinal direction of the fuel assembly and they are sacked in such a way that the top tie plate 6 in one fuel unit 3 is facing the bottom tie plate 5 in the next fuel unit 3 in the stack and such that the fuel rods 4 in all the fuel units 3 are parallel to one another. A fuel rod 4 contains fuel 1 in the form of a stack of fuel pellets 7b of uranium arranged in a cladding tube 7a. A coolant is adapted to flow from below and up through the fuel assembly.

Figure 2:
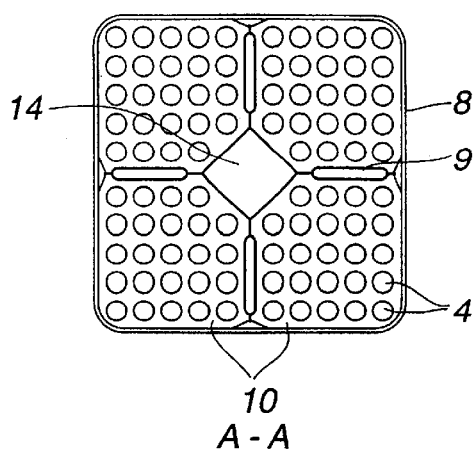
FIG. 2 shows a section A—A of the fuel assembly in FIG. 1.

FIG. 2 shows that a fuel assembly is enclosed in a fuel channel 8 with a substantially square cross section. The fuel channel 8 is provided with a hollow support member 9 of cruciform cross section, which is secured to the four walls of the fuel channel 8. In the central channel 14 formed of the support member 9, moderator water flows. The fuel channel 8 surrounds four vertical channel-formed parts 10, so-called sub-channels, with an at least substantially square cross section. The four sub-channels each comprises a stack of fuel units 3. Each fuel unit 3 comprises 24 fuel rods 4 arranged in a symmetrical 5×5 lattice.

The fuel assembly in FIG. 2 comprises 10×10 fuel rod positions. By a fuel rod position is meant a position in the lattice. All the fuel rod positions in the lattice need not be occupied by fuel rods 4. In certain fuel assemblies, a number of fuel rods 4 are replaced by one or a plurality of water channels. The introduction of a water channel changes the number of fuel rods 4 but not the number of fuel rod positions.

Figure 2A:
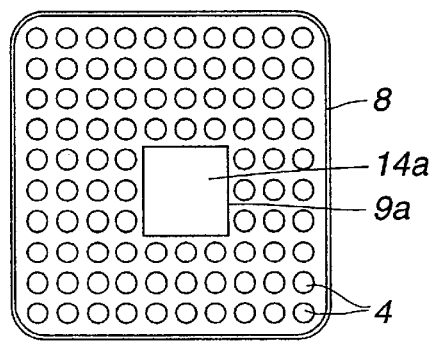
FIGS. 2a and 2b show alternative embodiments in a section corresponding to the section A—A of the fuel assembly in FIG. 1.

FIG. 2a shows an alternative embodiment of a fuel assembly according to the invention. FIG. 2a shows a horizontal section through the fuel assembly which is provided with an internally arranged vertical channel 14a through which water is conducted in a vertical direction from below and upwards through the fuel assembly. The channel 14a is surrounded by a tube 9a with a substantially square cross section. The fuel units 3 are kept in position by being fitted onto the tube which surrounds the vertical channel 14a.

Figure 2B:
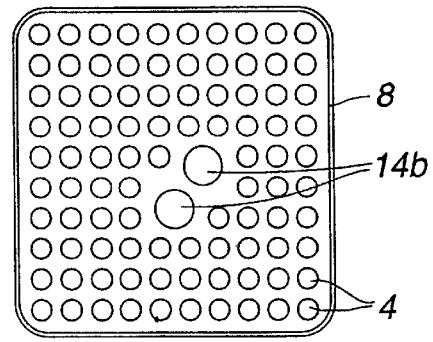

FIG. 2b shows an additional embodiment of a fuel assembly according to the invention. The figure shows a horizontal section through the fuel assembly which is provided with two centrally arranged vertical water rods 14b through which water is conducted from below and upwards through the fuel assembly. The water rods 14b have a diameter which is somewhat larger than the diameter of the fuel rods 4 and are formed with a substantially circular cross section. The fuel units 3 are kept in position by being fitted onto the water rods 14b.

Figure 3:
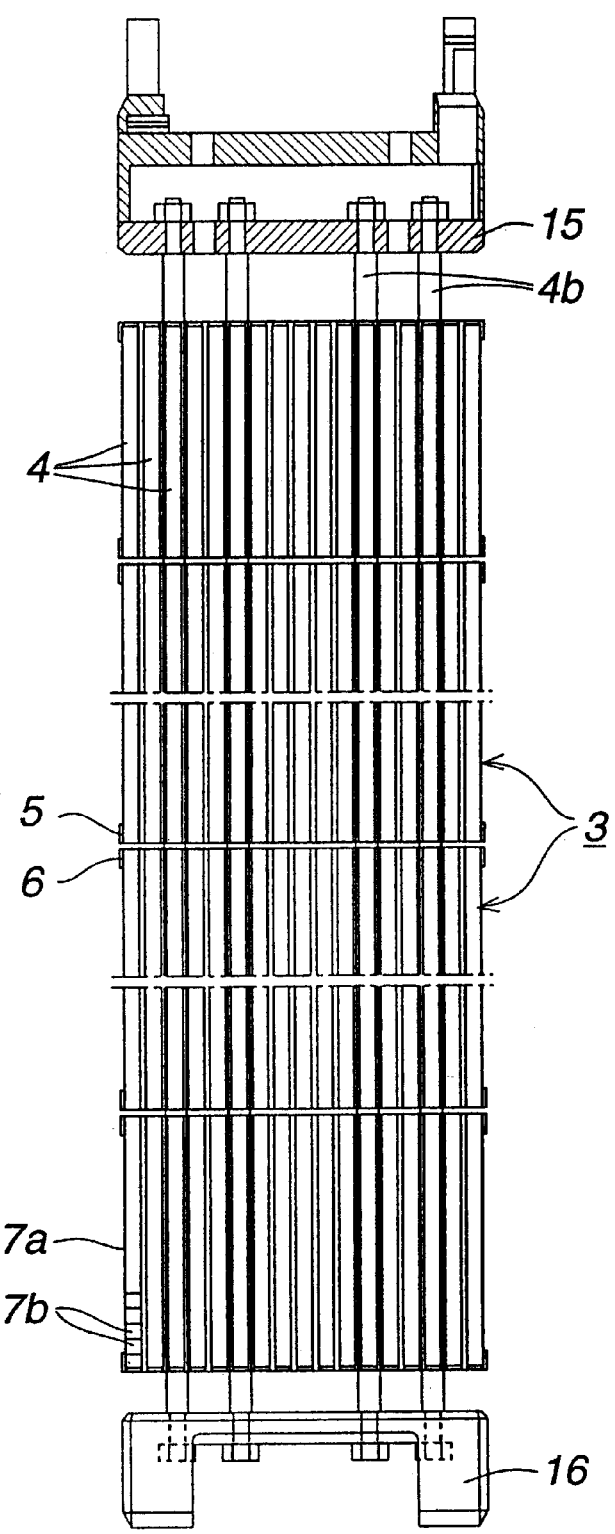
FIG. 3 shows in a vertical section a fuel assembly of pressurized-water type with short fuel units.

FIG. 3 shows a pressurized-water fuel assembly. In the same way as the fuel assembly in FIG. 1, it comprises a plurality of fuel units 3 stacked on top of each other. Each fuel unit 3 comprises a plurality of fuel rods 4 arranged in parallel and in spaced relationship to each other in a given lattice. Each fuel unit 3 further comprises a top tie plate 6 and a bottom tie plate 5 for attachment of the fuel rods 4 in their respective positions in the lattice. The fuel units 3 are stacked on top of each other in the longitudinal direction of the fuel assembly and they are stacked in such a way that the top tie plate 6 in one fuel unit 3 is facing the bottom tie plate 5 in the next fuel unit 3 in the stack, and such that the fuel rods 4 in all the fuel elements 3 are parallel to each other. A fuel rod 4 contains fissionable material in the form of a stack of fuel pellets 7b of uranium arranged in a cladding tube 7a. A coolant is adapted to flow from below and upwards through the fuel assembly. A number of so-called control rod guide tubes 4b are a ranged extending through the whole fuel assembly. The control 1 rod guide tubes 4b are intended to receive finger-shaped control rods (not shown) which are inserted into and withdrawn from, respectively, the guide tubes 4b for the purpose of controlling the power of the nuclear reactor. The guide tubes extend between a top part 15 and a bottom par 16. The top part 15 is arranged above the uppermost fuel unit 3 in the fuel assembly and the bottom part 16 is arranged below the lowermost fuel unit 3 in the fuel assembly. The fuel units 3 are kept in position by being fitted onto the control rod guide tubes 4b.

Figure 4:
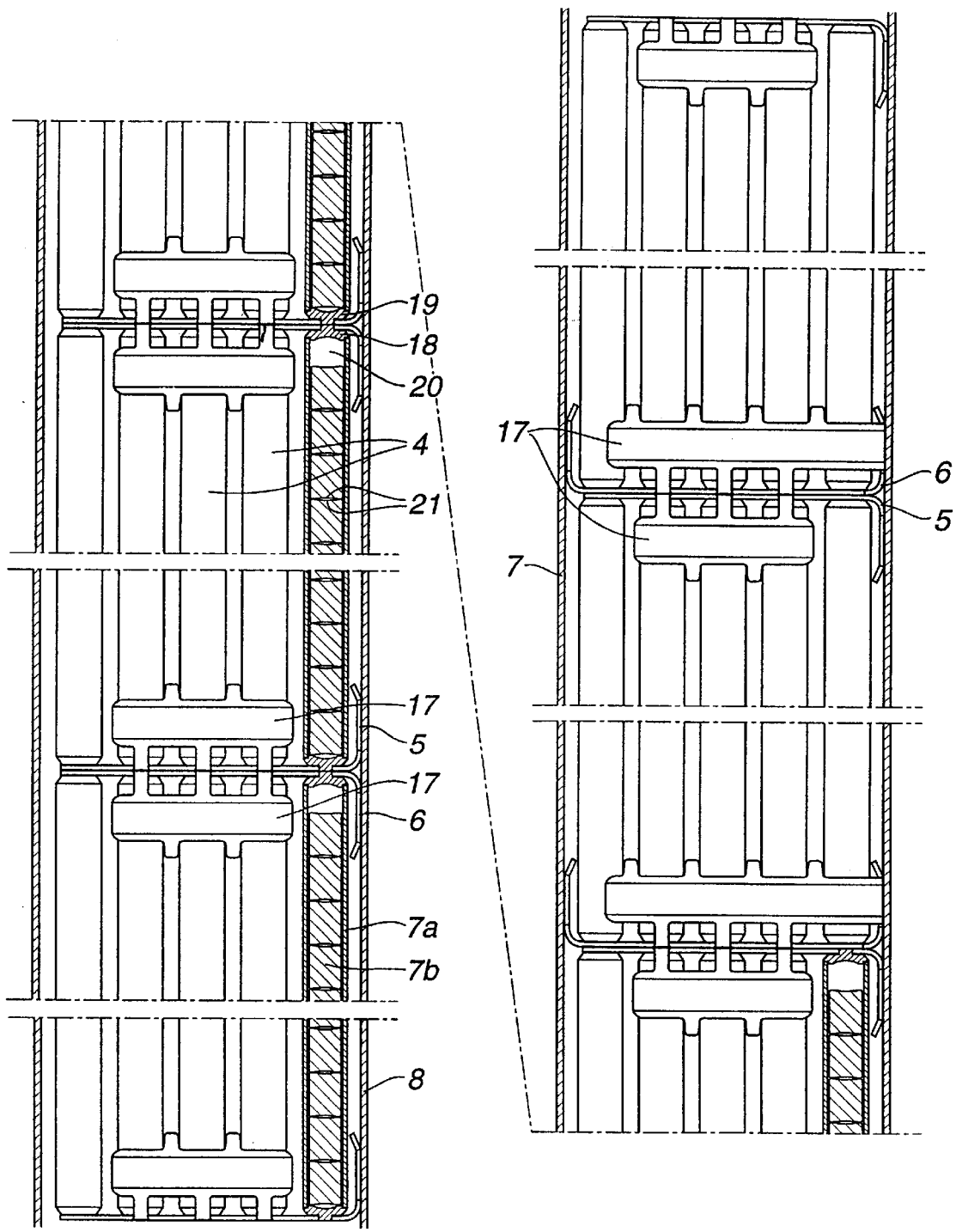
FIG. 4 shows on the lefthand side of the figure a lower part and on the righthand side of the figure an upper part of a fuel assembly according to FIG. 1, comprising top and bottom tie plates with side supports.

FIG. 4 shows a fuel assembly for a boiling water reactor comprising top and bottom tie plates 6 and 5 with side supports 17. On the lefthand side, side supports 17 are shown which are arranged in a lower part of the fuel assembly and on the righthand side in the figure, side supports 17 are shown which are arranged in an upper part. In the lower parts of the fuel assembly, it is suitable to arrange top and bottom tie plates 6, 5 with as low a flow resistance as possible. In the upper parts, on the other hand, it is suitable to arrange side supports 17 which have the capacity to scrape off coolant flowing upwards through the fuel assembly along the walls of the fuel channel and to direct it towards the center of the fuel assembly. The bottom tie plates 5 are therefore preferably formed with larger side supports 17 in the upper parts compared with the lower part of the fuel assembly.

In FIG. 4, a fuel rod 4 is indicated with a stack of fuel pellets. The fuel rods 4 are provided at their upper and lower ends, respectively, with a top plug 18 and a bottom plug 19, respectively, which are fixed to the top tie plate 6 and the bottom tie plate 5, respectively. In the upper end of the fuel rods 4, an axial gap 20 is arranged. The purpose of the axial gap 20 is to accumulate fission gases, formed during operation, and thermal expansion of the column of fuel pellets 7b. The fuel pellets 7b are shown with a cupped shape 21. The cup shape 21 makes it possible for part of the thermal expansion and the formed fission gas to accumulate between the pellets 7b, whereby the axial gap 20 may be made correspondingly shorter in the axial direction. It is desired as far as possible to avoid axial gaps 20 in fuel assemblies since chemically aggressive environments may arise at these assemblies.

Figure 5A:
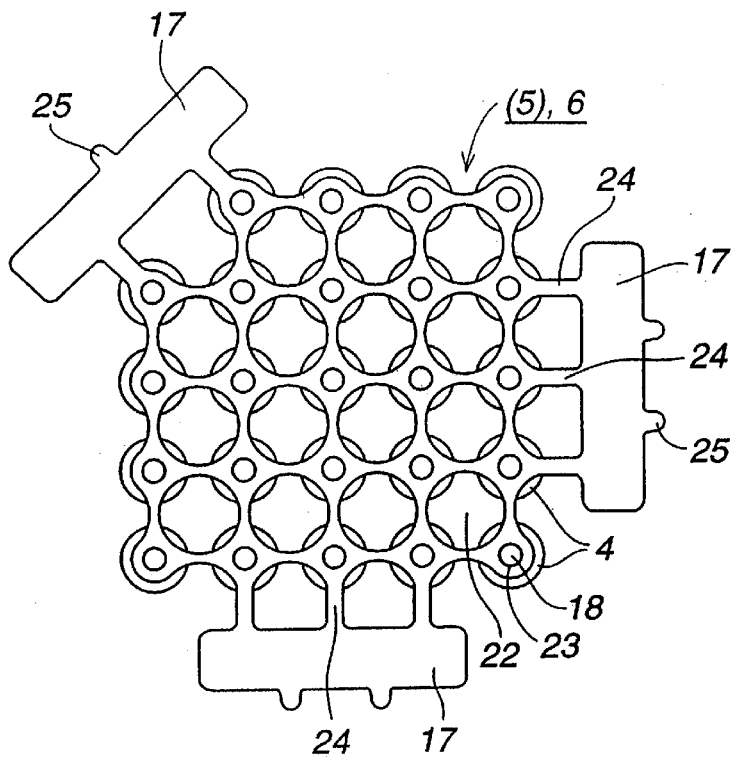
FIG. 5a shows a view from above of a top tie plate with side supports punched out in a plane sheet.

FIG. 5a shows a view from above of a top tie plate 6, punched out in a substantially plane sheet, with side supports according to the lower part of the fuel assembly shown in FIG. 4. The top tie plate 6 is shown before the side supports 17 have been folded into their final po ition. Below the top tie plate 6, fuel rods 4 are indicated, with top plugs 18 arranged in the top tie plate 6. A bottom tie plate 5 intended to be arranged so as to make contact with this top tie plate 6 may be designer in a manner corresponding to that of the shown top tie plate 6.

The top tie plate 6 in FIG. 5a is designed with a plurality of flow openings 22 disposed in an orthogonal pattern intended to be traversed by the coolant flowing upwards in the fuel assembly. These flow openings 22 are thus arranged substantially between the positions of the fuel rods 4. Between the flow openings 22 there are arranged smaller openings 23 for fixing the fuel rods in top plugs 18. The side supports 17 are designed as substantially rectangular parts which are connected via beams 24 to the structure of the rest of the top tie plate 6. The side supports 17 are then folded so as to form an angle of substantially 90° with the plane of the other structure. The side supports 17 may either be folded upwards or downwards in the axial direction of the fuel assembly. Further, the side supports 17 are provided with guiding tabs 25 arranged at the outer edge of the side supports 17. The task of the guiding tabs 25 is partly to guide the fuel assembly into a fuel channel 8 or between fuel assemblies of pressurized-water type with spacers, partly to guide coolant flowing upwards through the assembly and guide it towards the center of the fuel assembly. For this purpose, the guiding tabs 25 are folded around the edge of the side support 17 so as to form the desired angle, about 30°, therewith. The guiding tabs 25 are preferably arranged such that, in mounted position, they are arranged in the space between two fuel rods 4 (see reference numeral 35 in FIG. 5e).

Figure 5B:
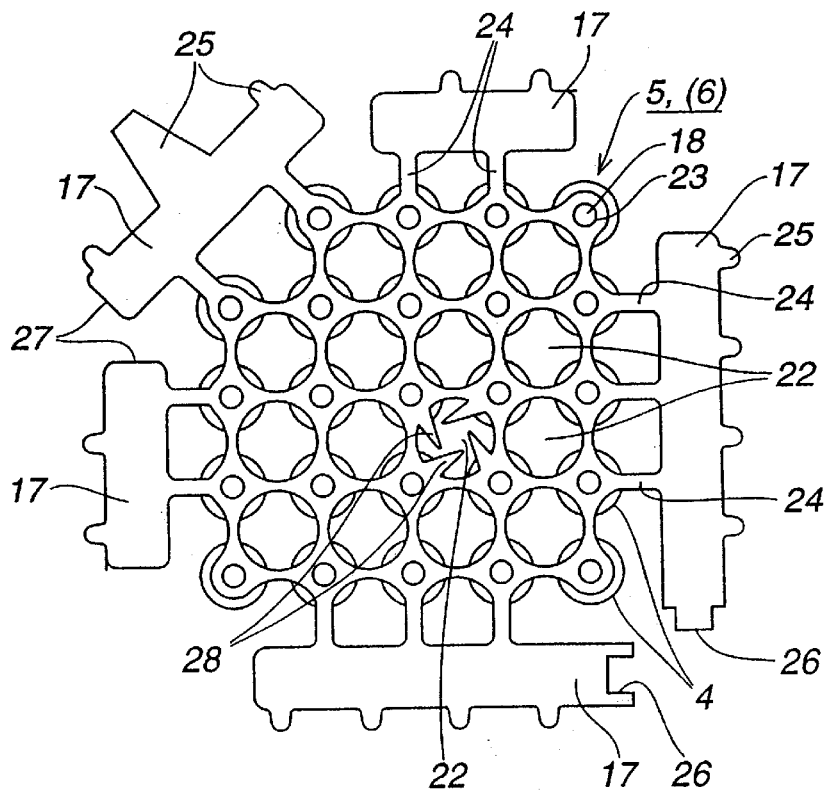
FIG. 5b shows a view from above of a bottom tie plate, punched out in a plane sheet, intended to be placed in the upper part of a fuel assembly. The bottom tie plate is provided with mixing vanes in one of the openings.

FIG. 5b shows an alternative embodiment of a bottom tie plate 5. The bottom tie plate 5 is intended to be placed in the upper part of a fuel assembly and is provided with more and larger supports 17 than what is shown in FIG. 5a and with more guiding tabs 25 for the purpose of achieving better guiding of coolant to the central parts of the fuel assembly. To increase the stability of the bottom tie plate 5, the side supports 17 are designed so that, in folded position, they can be joined to each other by means of, for example, welding or soldering (see reference numeral 27). The side supports 17 may include end tabs 26. In addition, the bottom tie plate 5 is provided with mixing vanes 28 in one of the flow openings 22. The mixing vanes 28 are shown in unfolded state but are folded so as to form a suitable angle with the plane of, the rest of the structure. The object of the mixing vanes 28 is to mix the coolant flowing upwards through the assembly to increase its cooling capacity and reduce the risk of the temperature around a fuel rod 4 becoming so high that the coolant leaves the fuel rod, in which case so-called dryout may arise. The risk of dryout is greatest in the upper part of the fuel assembly, and therefore the bottom plates 5 intended to be arranged in this part are suitably provided with mixing vanes 28 in one or more flow openings 22.

Figure 5C:
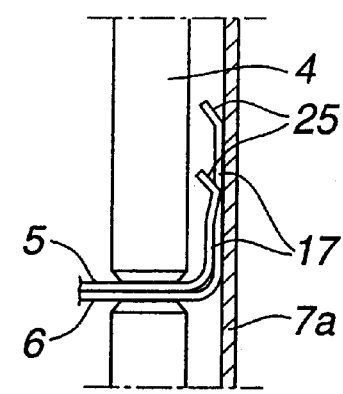
FIG. 5c shows in a view from the side how the side support of a top tie plate is inserted into the side support of a bottom tie plate arranged above the top tie plate.
Figure 5D:
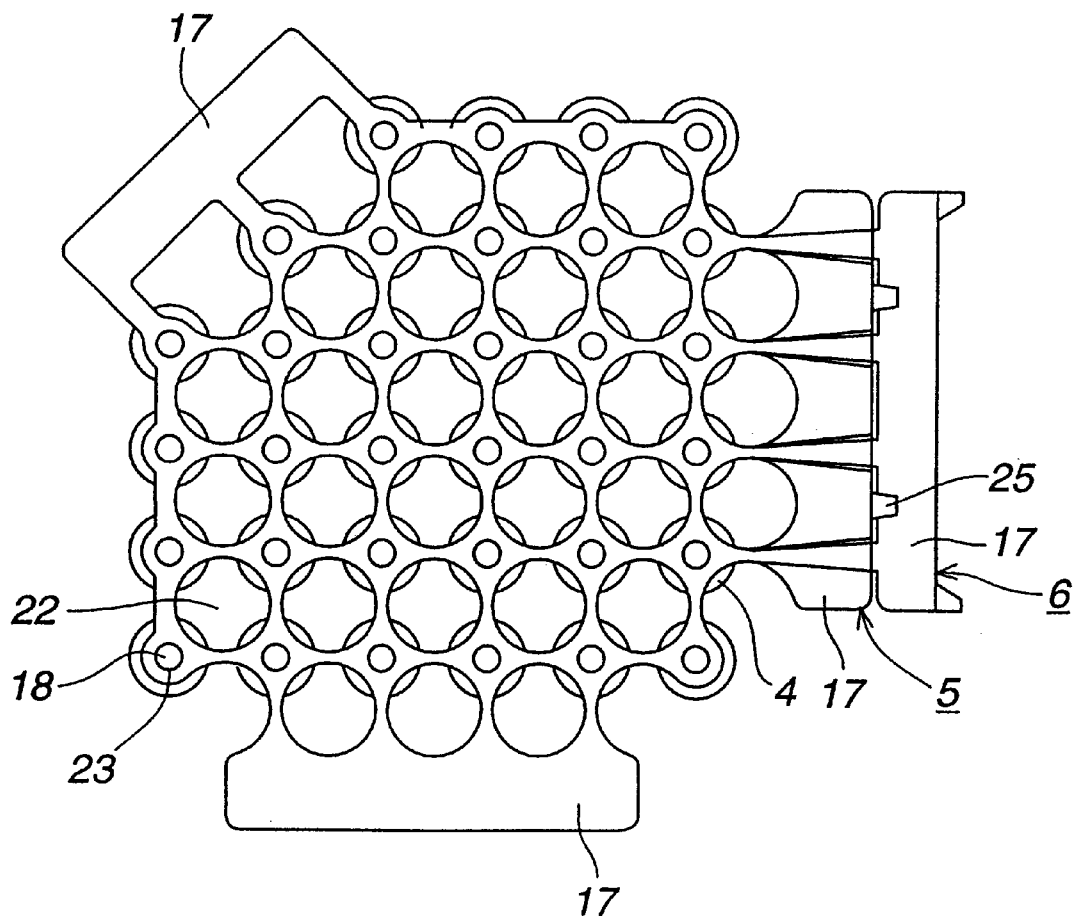
FIG. 5d shows a view from above of a bottom tie plate arranged above a top tie plate where one of the side supports of the top tie plate is formed to be folded in and be locked in the side support of the bottom tie plate.

FIGS. 1, 3 and 4 show that two top tie and bottom tie plates 6 and 5 arranged adjacent to each other are provided with side supports 17 folded in different directions, that is, the side support of the bottom tie plate is folded upwards and the side support of the top tie plate 6 is folded downwards. FIG. 5c shows an embodiment in which the side supports 17 of both the top tie plate 6 and the bottom tie plate 5 are folded upwards in the fuel assembly. In addition, the side support 17 of the top tie plate 6 is arranged inserted into and fixed to the side support 17 of the bottom tie plate 5 for joining or guiding of two fuel units 3 stacked on top of each other. FIG. 5d shows the top tie plate 6 and the bottom tie plate 5, respectively, according to FIG. 5c in unfolded form. The outer side support 17 shown in FIG. 5d thus belongs to the top tie plate 6 arranged below the bottom tie plates 5. When stacking the fuel units 3 on top of each other, the side supports 17 are fitted into-each other and fixed in such a way that they may be detached from each other again.

Figure 5E:
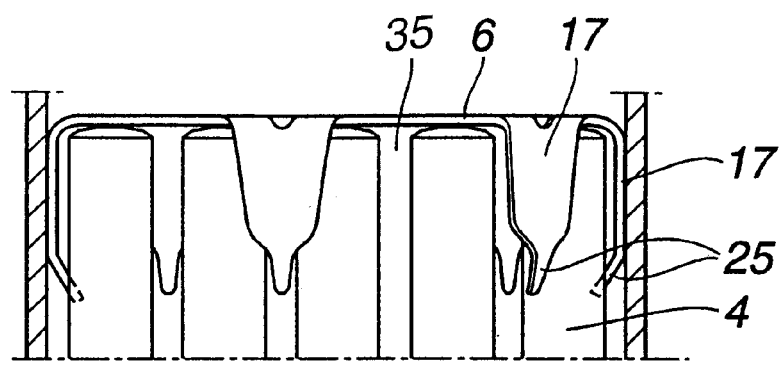
FIG. 5e shows in a view from above an alternative embodiment of the side support of a top tie plate.
Figure 5F:
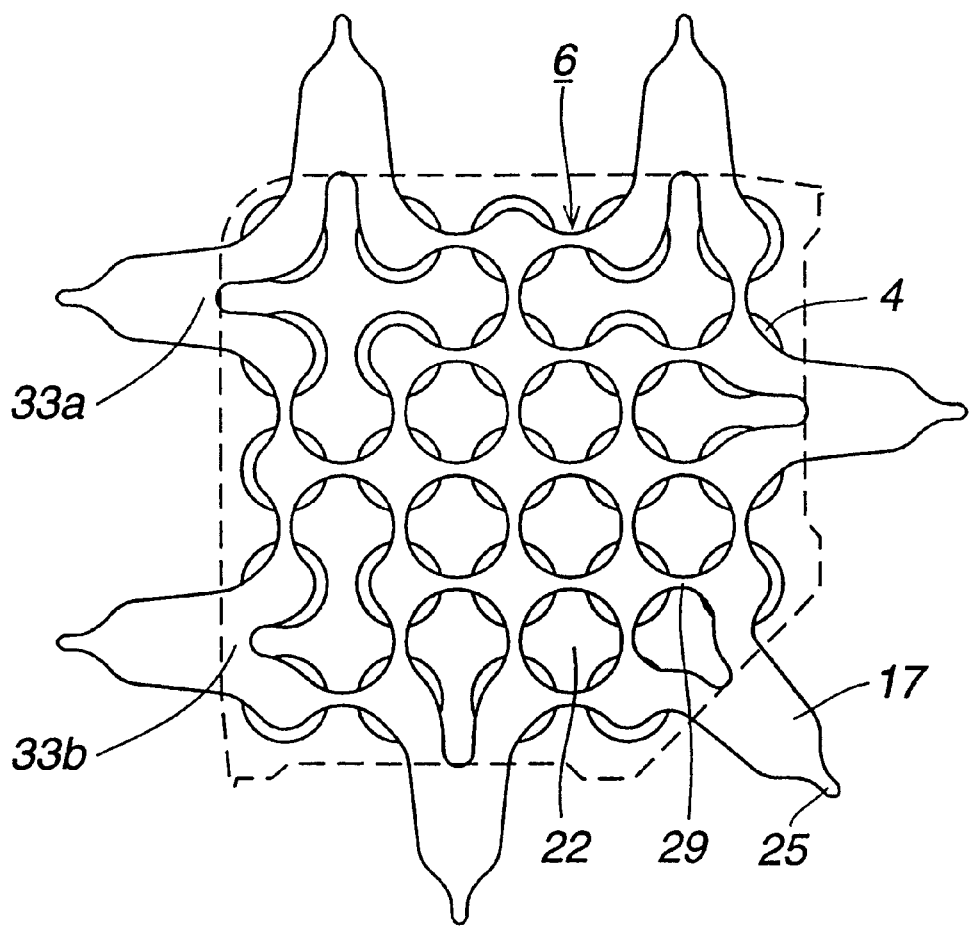
FIG. 5f shows a view from above of a top tie plate, punched out in a plane sheet, with side supports according to FIG. 5e.

FIG. 5e shows an alternative embodiment of a top tie plate 6 with side supports which are considerably smaller than those shown in FIGS. 5a–5d. The side supports 17 are substantially tapering in an outward direction and are provided at their respective ends with guiding tabs 25. In FIG. 5f, where the top tie plate 6 is shown unfolded in a view from above, it is clear that the rest of the structure has also been given a more open shape than the structures shown in FIGS. 4 and 5a–5d. The more open structure has been achieved by forming no beams 29 between some of the flow openings 22. A top tie plate 6 with this design gives rise to a very low flow resistance and hence a low pressure drop across the fuel assembly. A bottom tie plate 5 may of course, be formed in the same way as the top tie plate 6 described here.

FIG. 5f further shows two different embodiments of the design of the side supports 17. The design at reference numeral 33a is preferable from the point of view of pressure drop in that the structure is open. The design at reference numeral 33b gives a stiffer construction of the side supports. In an advantageous embodiment, the side supports 17 are folded with as small a radius as is possible in practice, which also contributes to increased stiffness.

Figure 6A:
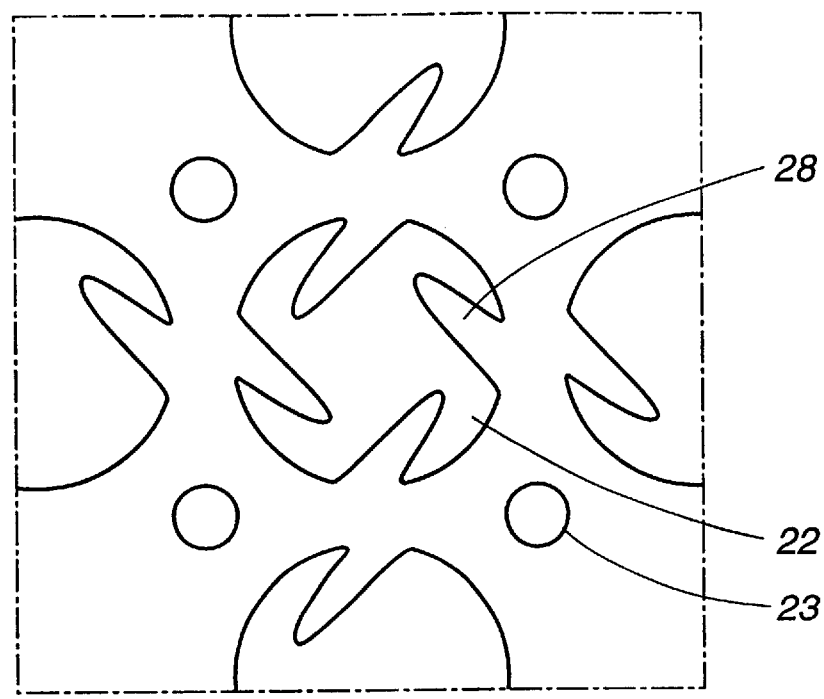
FIG. 6a shows in a view from above mixing vanes punched out in a top tie plate and a bottom tie plate, respectively.
Figure 6B:
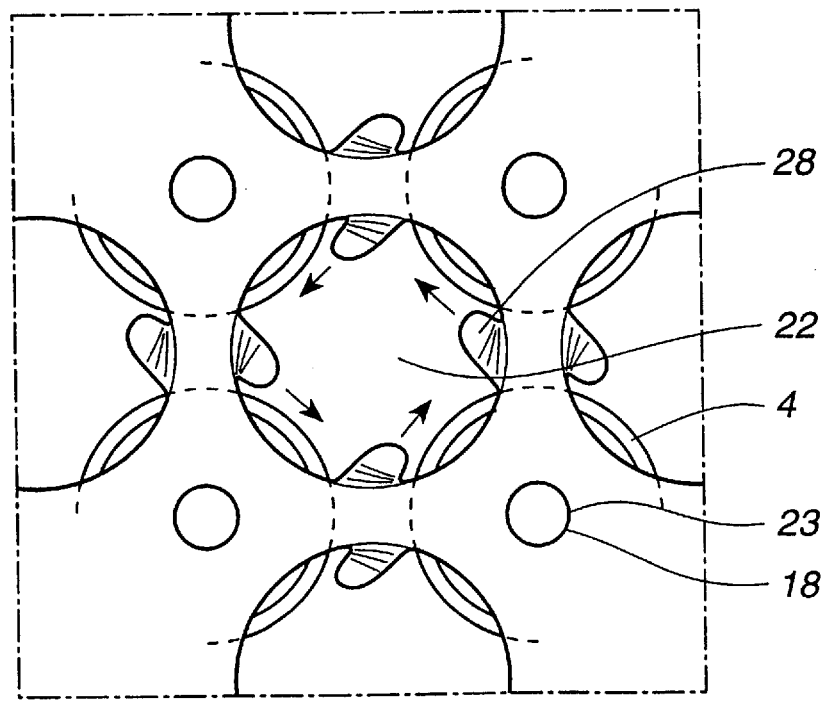
FIG. 6b shows in a view from above a top tie plate arranged in a fuel unit: with mixing vanes which are bent in relation to the plane of the top tie plate, towards the observer, into the desired shape.

FIG. 6a shows part of a top and bottom tie plate 6 and 5, respectively, with punched-out and still,unfolded mixing vanes 28 in the flow openings 22. The mixing vanes 28 are tapering in an outward direction and extend from the structure and into the flow opening 22. FIG. 6b shows the same mixing vanes 27 folded up from the plane of the rest of the structure, towards the observer. The arrows in FIG. 6b indicate the rotation and mixing achieved by the mixing, vanes 28 in the flow which passes the flow opening 22. In FIG. 6b, also the fuel rods 4 arranged below the plate 5, 6 are indicated.

Figure 7A:
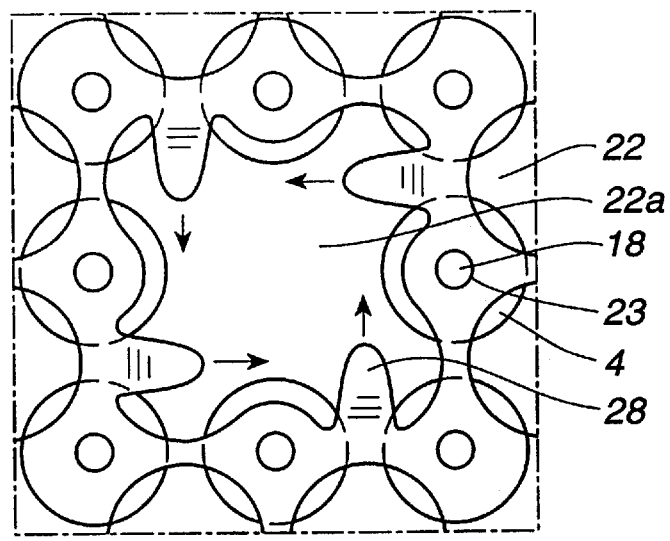
FIG. 7a shows in a view from above mixing vanes arranged in a top tie plate around a space intended to be arranged in a region in a fuel unit where one fuel rod is missing.
Figure 7B:
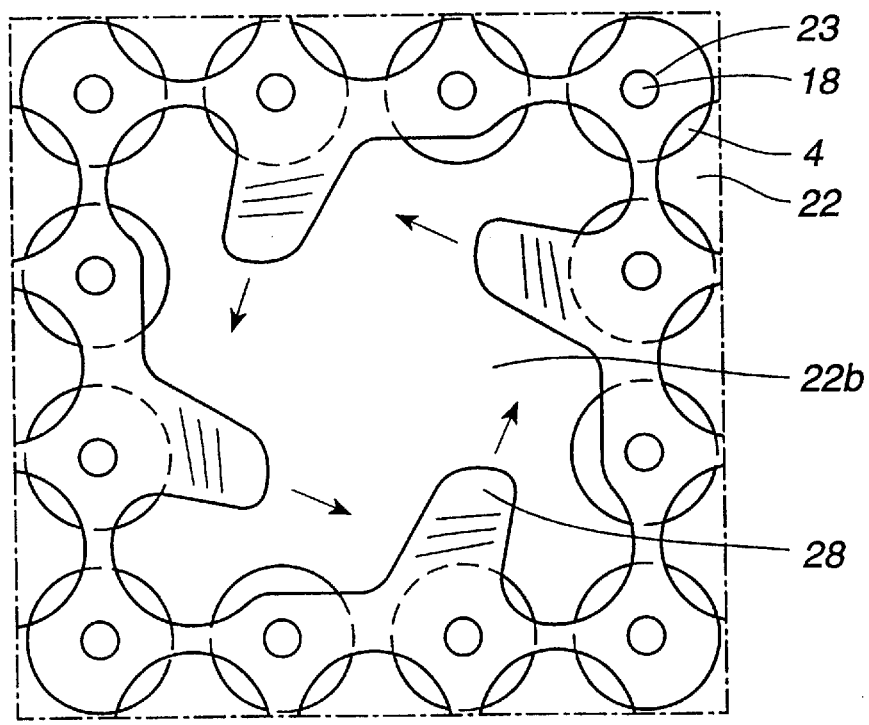
FIG. 7b shows in a view from above mixing vanes arranged in a top tie plate around a space intended to be arranged in a region in a fuel unit where four fuel rods are missing.

FIG. 7a shows part of a top and bottom tie plate 6 and 5, respectively, with punched-out and folded mixing vanes 28 in an enlarged flow opening 22a. The flow openings 22 may be enlarged in the event that fuel rods 4 are missing in some of the fuel rod positions of the fuel unit 3. FIG. 7a shows an enlarged flow opening 22a arranged above an empty fuel rod position. The flow opening 22a may then be provided with mixing vanes 28 according to FIG. 7a. FIG. 7b shows a corresponding enlarged flow opening 22b arranged above four empty fuel rod positions. The arrows in FIGS. 7a, 7b indicate the mixing of the flow caused by the mixing vanes 28 projecting from the structure.

Figure 8:
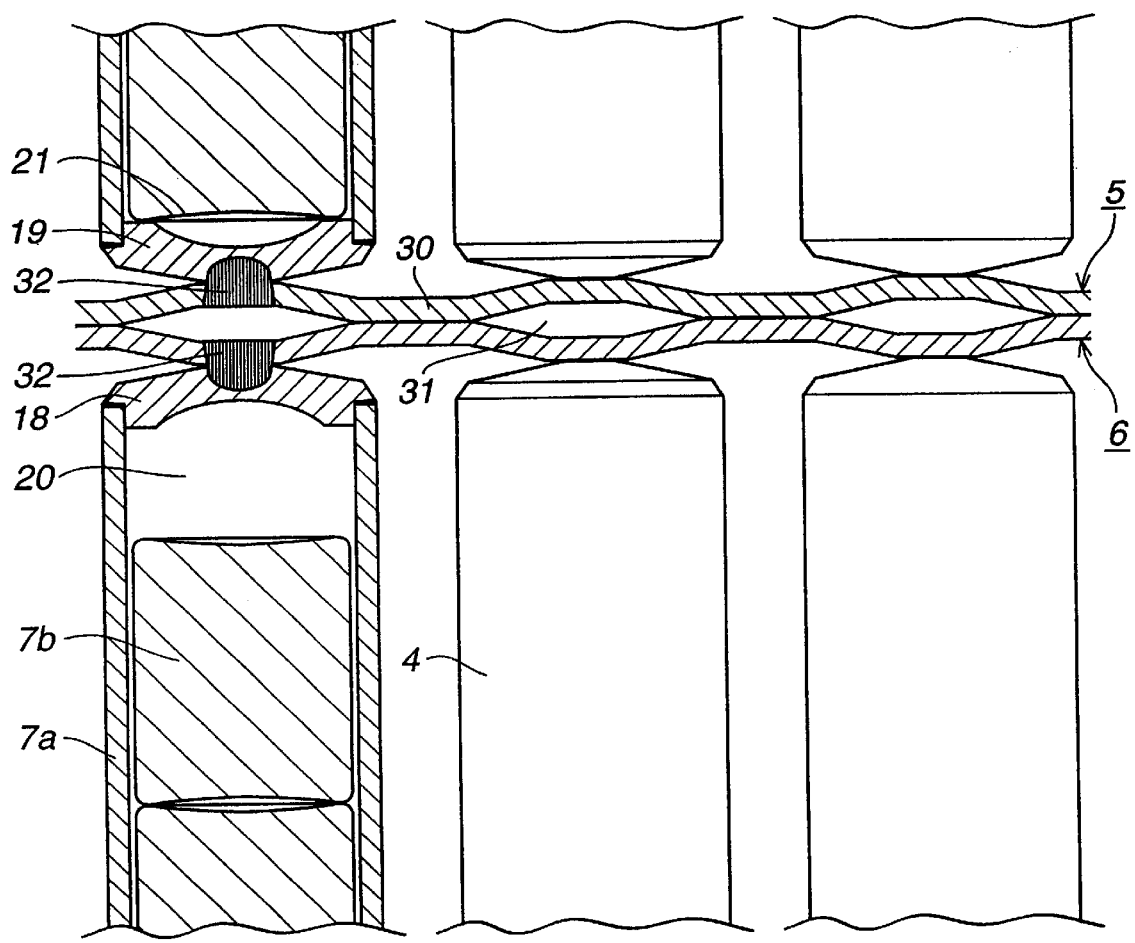
FIG. 8 shows a top tie plate and a bottom tie plate with a folded Cross section. The top and bottom tie plates are adapted so that, between the fuel rods, they make contact with each other and, in the fuel rod positions, they are arranged at a distance from each other.

FIG. 8 shows a top and bottom tie plate 6 and 5 with a wavy cross section. The top and bottom tie plates 6 and 5 are arranged so as to make contact with each other between the fuel rods 4 (see reference numeral 30) and are arranged in spaced relationship to each other in the fuel rod positions (see reference numeral 31). The folded top and bottom tie plates 6 and 5 should be formed with flattened angles to prevent fuel rods 4 from moving laterally within the fuel unit 3 as a result of the top and bottom tie plates 6 and 5 being deformed when the fuel rod 4 grows axially.

FIG. 4 shows that the fuel rods 4 are provided with top and bottom plugs 18 and 19, respectively, with lugs which are inserted into and fixed to the top and bottom tie plates 6 and 5, respectively. FIG. 8 shows an alternative embodiment where the top and bottom tie plates 6 and 5, respectively, are instead joined together by means of laser welding. The fuel rod 4 is then placed tightly against the bottom and top tie plates 5 and 6, respectively, whereafter the materials in the plug and the plate 5, 6 are fused by means of laser technique (see reference numeral 32) or by means of resistance welding.

FIGS. 4 and 5 indicate top and bottom tie plates 6 and 5 for a fuel assembly of boiling water type but the same principles are, of course, applicable to fuel assemblies of pressurized-water type. In fuel assemblies of pressurized-water type, however, the top and bottom tie plates 6 and 5, respectively, are adapted to make contact with corresponding top and bottom tie plates 6 and 5, respectively, in adjacently located fuel units 3. All the embodiments of the shown top tie plates are also applicable to bottom tie, plates.

What is claimed is:

1. A fuel assembly for a light-water reactor with a substantially square cross section comprising a plurality of fuel rods extending between a bottom tie plate and a top tie plate, a coolant flowing upwards through the fuel assembly, wherein the top tie plate or the bottom tie plate comprises flow openings for the passage of the coolant and side supports for supporting the fuel rods in the lateral direction, the side supports being formed in one and the same sheet-metal piece as the flow openings and being folded substantially 90° in relation to the rest of the structure of the top tie plate or the bottom tie plate, and wherein guiding tabs are arranged at the outer ends of the side supports, said tabs being folded in relation to the plane of the side support and towards the central part of the top or bottom tie plate.

2. A fuel assembly according to claim 1, wherein the side supports are made with a substantially rectangular cross section.

3. A fuel assembly according to claim 1, wherein the side supports in a folded-up state, are joinable to an adjacent side support arranged in the same top tie plate and bottom tie plate, respectively.

4. A fuel assembly according to claim 1, wherein are adapted such that a side support in a top tie plate may be fitted into a bottom tie plate arranged adjacent to said top tie plate, or vice versa, such that the side supports thereof are fixed to each other in a detachable manner.

5. A fuel assembly according to claim 1, wherein the side supports are made with a substantially tapering shape.

6. A fuel assembly for a light-water reactor with a substantially square cross section comprising a plurality of fuel rods extending between a bottom tie plate and a top tie plate, a coolant flowing upwards through the fuel assembly, wherein the top tie plate or the bottom tie plate is made in one sheet-metal piece with a plurality of flow openings and wherein, in the same sheet, mixing vanes are arranged, punched out in the flow openings and folded in relation to the rest of the plane of the top or bottom tie plate for mixing the coolant flowing through the flow opening.

7. A fuel assembly for a light-water reactor with a substantially square cross section comprising a plurality of fuel rods extending between a bottom tie plate and a top tie plate, a coolant flowing upwards through the fuel assembly, wherein the top tie plate or the bottom tie plate comprises flow openings and side supports for supporting the fuel rods, said flow openings and side supports formed in the same sheet-metal piece and is made with a wavy cross section such that a top tie plate arranged adjacent to a bottom tie plate makes contact therewith in portions surrounding flow openings and wherein, between these portions, they are arranged in spaced relationship to each other.

8. A fuel assembly according to claim 1, wherein at least one of the top tie plates or the bottom tie plates is made in one sheet-metal piece with a plurality of flow openings and that, in the same sheet, vanes are arranged, punched out in the low openings and folded in relation to the rest of the plane of the top or bottom tie plate for mixing the coolant flowing through the flow opening.

9. A fuel assembly according to claim 1, wherein the top tie plate or the bottom tie plate comprises flow openings and side supports for supporting the fuel rods, said flow openings and side supports formed in the same sheet-metal piece and is made with a wavy cross section such that the top tie plate arranged adjacent to a bottom tie plate makes contact therewith in portions surrounding flow openings and wherein, between these portions, they are arranged in space relationship to each other.

10. A fuel assembly for a light-water reactor with a substantially square cross section comprising a plurality of fuel rods extending between a bottom tie plate and a top tie plate, a coolant flowing upwards through the fuel assembly, wherein the top tie plate or the bottom tie plate comprises flow openings for the passage of the coolant and side supports for supporting the fuel rods in the lateral direction, the side supports being formed in one and the same sheet-metal piece as the flow openings and being folded substantially 90° in relation to the rest of the structure of the top tie plate or the bottom tie plate, and Wherein the side supports are made with a substantially tapering shape.

11. A fuel assembly according to claim 10, wherein the side Supports are made with substantially regular cross section.

12. A fuel assembly according to claim 10, wherein the side supports, in a folded-up state, are joinable to an adjacent side support arranged in the same top plate and bottom tie plate, respectively.

13. A fuel assembly according to claim 10, wherein a side support in a top tie plate may be fitted into a bottom tie plate arranged adjacent to said top tie plate, or vice versa, such that the side supports thereof are fixed to each other in a detachable manner.

14. A fuel assembly according to claim 10, wherein guiding tabs are arranged at the outer ends of the side supports, said tabs being folded in relation to the plane of the side support and towards the central part of the top or bottom tie plate.

15. A fuel assembly according to claim 10, wherein at least one of the top tie plates or the bottom tie plates is made in one sheet-metal piece with a plurality of flow openings and that, in the same sheet, mixing vanes are arranged, punched d out in the flow openings and folded in relation to the rest of the plane of the top or bottom tie plate for mixing the coolant flowing through the flow opening.

16. A fuel assembly according to claim 10, wherein the top tie plate or the bottom tie plate comprises flow openings and side supports for supporting the fuel rods, said flow openings and side supports formed in the same sheet-metal piece and is made with a wavy cross section such that the top tie plate arranged adjacent to a bottom tie plate makes contact therewith in portions surrounding flow openings and wherein, between these portions, they are arranged in space relationship to each other.

* * * * *